United States Patent
Ben-Tzvi et al.

(10) Patent No.: US 11,413,745 B2
(45) Date of Patent: Aug. 16, 2022

(54) ARTICULATED, CLOSED KINEMATIC CHAIN PLANAR MONOPOD

(71) Applicant: Virginia Tech Intellectual Properties, Inc., Blacksburg, VA (US)

(72) Inventors: Pinhas Ben-Tzvi, Blacksburg, VA (US); Vinaykarthik Kamidi, Blacksburg, VA (US)

(*) Notice: Subject to any disclaimer, the term of this patent is extended or adjusted under 35 U.S.C. 154(b) by 835 days.

(21) Appl. No.: 16/140,353

(22) Filed: Sep. 24, 2018

(65) Prior Publication Data

US 2019/0091857 A1 Mar. 28, 2019

Related U.S. Application Data

(60) Provisional application No. 62/562,149, filed on Sep. 22, 2017.

(51) Int. Cl.
| | | |
|---|---|---|
| *B62D 57/032* | (2006.01) | |
| *B25J 9/10* | (2006.01) | |
| *B25J 9/16* | (2006.01) | |
| *B25J 19/00* | (2006.01) | |
| *B25J 17/00* | (2006.01) | |

(52) U.S. Cl.
CPC .......... *B25J 9/1065* (2013.01); *B25J 9/1664* (2013.01); *B25J 17/00* (2013.01); *B25J 19/0091* (2013.01); *B62D 57/032* (2013.01)

(58) Field of Classification Search
CPC ...... B62J 9/1065; B62J 9/16964; B62J 17/00; B62J 19/0091; B62D 57/032
See application file for complete search history.

(56) References Cited

U.S. PATENT DOCUMENTS

| | | | | |
|---|---|---|---|---|
| 4,202,423 A | * | 5/1980 | Soto .................. | B62D 57/00 180/8.6 |
| 4,502,556 A | * | 3/1985 | Bartholet ............ | B62D 57/02 180/8.6 |
| 4,511,011 A | * | 4/1985 | Bartholet ............ | B62D 57/02 180/8.6 |
| 6,109,378 A | * | 8/2000 | Paakkunainen ...... | B62D 57/032 180/8.5 |
| 6,394,740 B1 | * | 5/2002 | Derby ................ | B25J 9/042 414/744.1 |
| 6,478,314 B1 | * | 11/2002 | Klann ................ | A63H 11/00 180/8.1 |
| 6,962,220 B2 | * | 11/2005 | Takenaka ........... | B25J 19/0008 180/8.1 |
| 7,339,340 B2 | * | 3/2008 | Summer ............. | B62D 57/032 318/568.12 |

(Continued)

OTHER PUBLICATIONS

Kamidi et al; Design and Analysis of a Novel Planar Robotic Leg for High-Speed Locomotion; 2009 IEEE/RSJ International Conference on Intelligent Robots and Systems; 6 pages; Sep. 24-28, 2017; Vancouver, CA.

*Primary Examiner* — Jacob D Knutson
(74) *Attorney, Agent, or Firm* — Perilla Knox & Hildebrandt LLP; Jason M. Perilla

(57) ABSTRACT

The present invention concerns a novel leg mechanism for quadrupedal locomotion. This design engages a linkage to couple assembly that only requires a single degree of actuation. The topological arrangement of the system produces a foot trajectory that is well-suited for dynamic gaits including trot-running, bounding, and galloping.

6 Claims, 11 Drawing Sheets

(56) References Cited

U.S. PATENT DOCUMENTS

| | | | |
|---|---|---|---|
| 7,658,246 B2* | 2/2010 | Takenaka | B25J 19/0012 |
| | | | 180/8.6 |
| 8,042,627 B2* | 10/2011 | Yang | B62D 57/032 |
| | | | 180/8.6 |
| 8,157,031 B2* | 4/2012 | Xu | B62D 57/02 |
| | | | 180/8.1 |
| 9,283,673 B2* | 3/2016 | Godowski | B25J 9/106 |
| 9,474,632 B2* | 10/2016 | Bosscher | B25J 19/0091 |
| 9,895,804 B1* | 2/2018 | Perkins | B25J 9/1664 |
| 10,189,519 B2* | 1/2019 | Hurst | B62D 57/032 |

* cited by examiner

Dependent coordinates    Independent coordinates $[q_1 \, q_2 \, q_3 \, q_4 \, q_5 \, q_{Pitch}]^T \xrightarrow{T} [q_1 \, q_{Pitch}]^T$

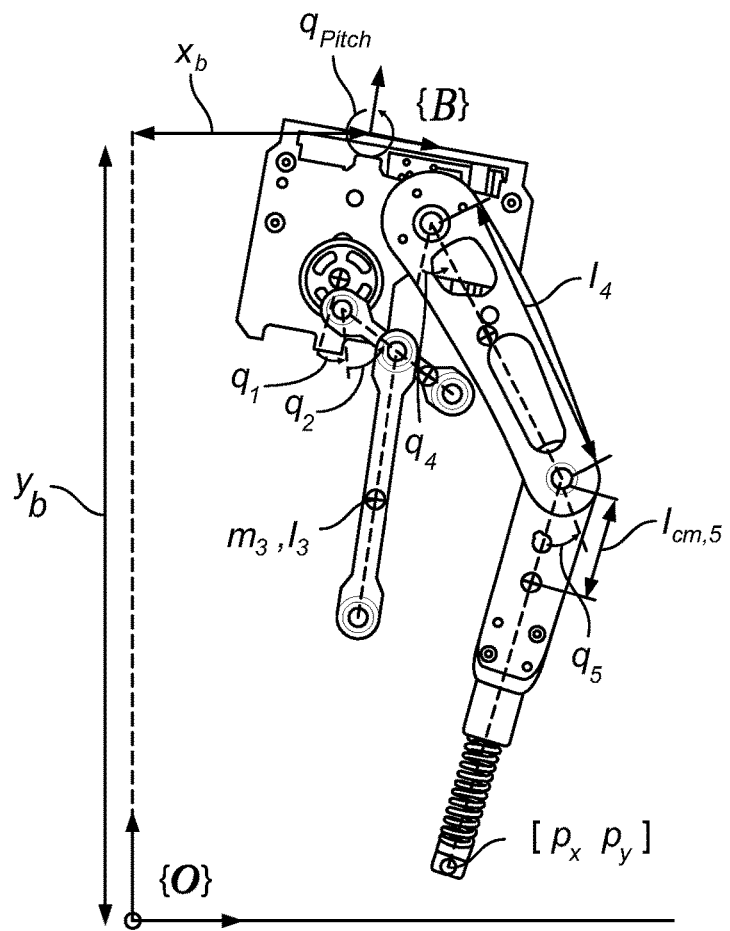
FIG. 7A
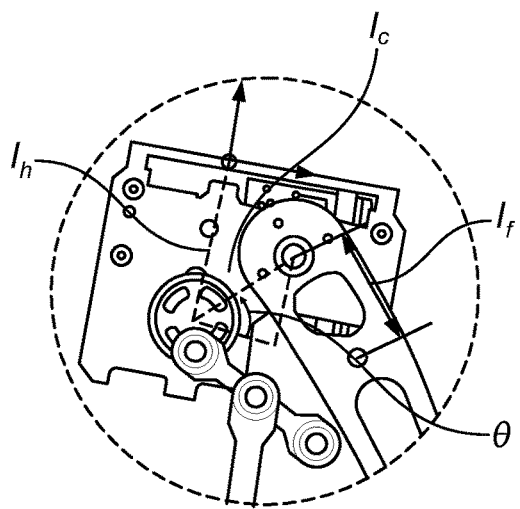
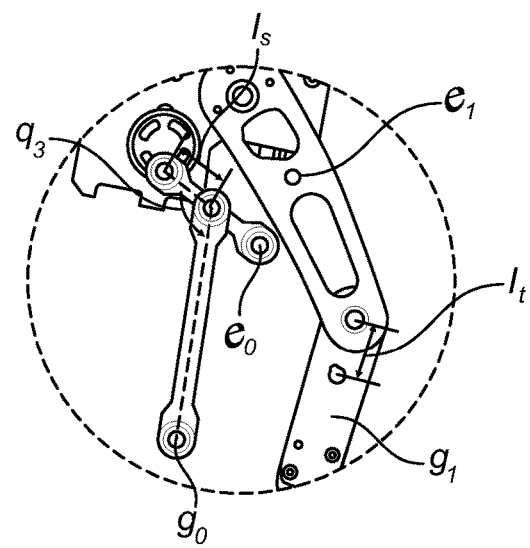
FIG. 7B        FIG. 7C

ARTICULATED, CLOSED KINEMATIC CHAIN PLANAR MONOPOD

RELATED APPLICATIONS

This application claims the benefit of U.S. Provisional Application No. 62/562,149 filed Sep. 22, 2017, and herein incorporated by reference.

STATEMENT REGARDING FEDERALLY SPONSORED RESEARCH & DEVELOPMENT

This invention was made with government support National Science Foundation under Grant No. 1557312. The government has certain rights in the invention.

INCORPORATION BY REFERENCE OF MATERIAL SUBMITTED ON A COMPACT DISC

Not applicable.

BACKGROUND OF THE INVENTION

The transition of legged robots from test-benches into real-world scenarios becomes viable only when the dynamic locomotion and maneuvers are developed enough to require only high-level inputs to operate these complex machines. A significant amount of research by the scientific community is motivated by this hypothesis, including the exploration of hybrid dynamic control frameworks. Hybrid dynamics can be defined as a composition of stance and flight domains that alternate when triggered by instantaneous impacts. In addition to the challenge of utilizing hybrid dynamics, popular approaches towards the design of legged robots dictate the inclusion of multiple degrees of freedom (DOF) per leg which necessitates multi-layered controllers that further increase complexity. Generally, to take a single step, these machines have a whole-body trajectory generator at the higher level. At the lower level, such systems have (i) a foot trajectory generator that is guided by the body trajectory (ii) an inverse kinematic controller that plans the leg motion with respect to the generated foot trajectory while avoiding singularities. Despite impressive performance in laboratory settings, active research is aimed at building robust controllers to account for delays and singularities before legged robots may navigate urban environments. An alternative approach that has shown promise in quadrupedal platforms is the implementation of only one actuator per leg. The articulated nature of legged robots is most effectively captured by a closed kinematic chain (CKC) mechanism due to the ability to control passive degrees of freedom with a single actuator through closed chains of linkages. Additional advantages of CKC mechanisms, for the purposes of legged robotics, are reduced weight due to the concentration of actuators at a proximal location and an increased rigidity-to-weight ratio. These properties are of great value in high-speed applications such as dynamic locomotive gaits. While the higher-level control functionalities remain complex due to the hybrid nature of dynamic legged locomotion, an indirect advantage of a single DOF CKC mechanism is that it mechanically encodes robustness at the lower level by directly eliminating the need for the previously highlighted foot trajectory generators and on-board inverse kinematic calculations. Given that the majority of existing one DOF mechanisms are at best quasi-statically stable systems, a single DOF CKC mechanism has been used whose topological arrangement ensures a trajectory that promotes dynamic locomotion.

The ramifications of this design choice are revealed during an effort to transform the dynamic model into state space form. Principally, the CKCs are characterized by algebraic equations (AE) and the resultant systems of equations that describe the system are identified as differential algebraic equations (DAEs). From a simulation standpoint, numerical solutions of DAEs are more challenging to obtain in comparison to ordinary differential equations (ODEs). Within robotics, constrained mechanisms are defined by index-3 DAEs. The index represents the number of times that holonomic constraints must be differentiated with respect to time before the form of ODE can be assumed. One of the existing methods in literature proposes direct interaction with index-3 DAEs through input-output linearization. Another technique suggests differentiation of holonomic constraints twice, thus representing them at the velocity level, and then solving the AE to obtain an implicit state space representation of the resultant index-1 DAE. However, a by-product of this method is the magnification of drift in solution. Furthermore, the admissibility of the result is solely dependent on the satisfaction of the initial condition. Drift stabilization formulations have been proposed in the past to address this issue. Amongst these, Baumgarte's stabilization method is a widely adopted scheme. Yet its appeal is shadowed by the difficulty of choosing appropriate parameters to guarantee robustness. Moreover, from the control perspective a rich library of stable model-based controllers exists for dynamics represented by ODEs in explicit state space form but are not readily extended to DAE descriptions that are implicit in nature.

Beyond conventional practices of dealing with DAEs directly, singular perturbation formulation (SPF) avoids the limitations by approximating the DAE as an ODE. They were first implemented on the model of a two-phase flow heat exchanger to express the DAEs in explicit state space form. This method was adapted to a fixed base CKC robot where the AE is substituted by an asymptotically stable ODE that characterizes the constraint violation. The resultant ODE is also known as the fast dynamics ODE. The success of this approach lies in the rapid disappearance of this fast dynamics term, thus resulting in a convergence to the slower subsystem. It is noteworthy that the SPF treatment results in second-order ODEs that are equal in number to the independent generalized coordinates that describe the system.

BRIEF SUMMARY OF THE INVENTION

In one embodiment, the present invention provides a method, approach, and solution that concern a legged robot with a novel topological arrangement, that includes two closed loops which may be kinematic loops. The loops may include a vertically oriented floating-base, with one active joint and one passive revolute joint (hip joint) arranged, parallel to the frontal plane and having a driving link connected to the active joint and the hip flexion and extension link connected to the other end of the driving link with another revolute joint. Also provided is a knee flexion and extension link mounted on a revolute joint located on the hip flexion and extension link, close to its point of attachment with the driving link.

A femur link may be mounted on the passive revolute joint, located on the base with two other revolute joints, one close to its point of attachment with the base and one at the other end on which the tibia link is mounted. The free end of the hip flexion and extension link is mounted on the first revolute joint of the femur link, forming the first closed loop. The tibia link has a revolute joint, located close to its connecting point with the femur link, which connects the free end of the knee flexion and extension link, forming the second closed loop. The distal end of the tibia joint is mounted with a compression spring of predetermined stiffness value to provide compliance during impact.

In other embodiments, the present invention provides a legged robot wherein the lower end of the spring is fitted with a compliant rubber foot to provide a second-stage of compliance against impact forces.

In other embodiments, the present invention provides a legged robot wherein the flight-phase trajectory of the foot is jerk free and has a retraction rate that reduces energy losses at touchdown.

In other embodiments, the present invention provides a legged robot wherein the stance-phase trajectory is a sinusoidal curve, that establishes contact with the ground at its lowest point generating ground-reaction forces enough to perform dynamic gaits.

In other embodiments, the present invention provides a legged robot with one continuously rotating actuator to perform dynamic locomotion (bound, trot, amble and canter).

In other embodiments, the present invention provides a legged robot with a novel topological arrangement, with two closed loops, comprising a vertically oriented floating-base, with one active joint and one passive revolute joint (hip joint) arranged, parallel to the frontal plane and having a driving link connected to the active joint and the hip flexion and extension link connected to the other end of the driving link with another revolute joint; a knee flexion and extension link mounted on a revolute joint located on the hip flexion and extension link, close to its point of attachment with the driving link; a femur link mounted on the passive revolute joint, located on the base with two other revolute joints, one close to its point of attachment with the base and one at the other end on which the tibia link is mounted; the free end of the hip flexion and extension link is mounted on the first revolute joint of the femur link, forming the first closed loop; the tibia link has a revolute joint, located close to its connecting point with the femur link, which connects the free end of the knee flexion and extension link, forming the second closed loop; the tibia link being a rigid link with no compliance elements (spring); and a compliance controller that implements a virtual spring acting between the active joint on the base and the foot.

In other embodiments, the present invention provides a legged robot wherein the compliance can be varied based on the required clearance between the foot and the ground.

In other embodiments, the present invention provides a dynamic quadrupedal robot comprised of four legs; each leg comprising of: a vertically oriented floating-base, with one active joint and one passive revolute joint (hip joint) arranged, parallel to the frontal plane and having a driving link connected to the active joint and the hip flexion and extension link connected to the other end of the driving link with another revolute joint; a knee flexion and extension link mounted on a revolute joint located on the hip flexion and extension link, close to its point of attachment with the driving link; a femur link mounted on the passive revolute joint, located on the base with two other revolute joints, one close to its point of attachment with the base and one at the other end on which the tibia link is mounted; the free end of the hip flexion and extension link is mounted on the first revolute joint of the femur link, forming the first closed loop; the tibia link has a revolute joint, located close to its connecting point with the femur link, which connects the free end of the knee flexion and extension link, forming the second closed loop. The tibia link being a rigid link with no compliance elements (spring); and a compliance controller that implements a virtual spring acting between the active joint on the said base and the foot.

In other embodiments, the present invention provides a quadrupedal robot wherein the front legs and back legs are mounted on two different sagittal planes creating an offset for enhanced stability.

It is to be understood that both the foregoing general description and the following detailed description are exemplary and explanatory only and are not restrictive of the invention, as claimed.

BRIEF DESCRIPTION OF THE SEVERAL VIEWS OF THE DRAWINGS

In the drawings, which are not necessarily drawn to scale, like numerals may describe substantially similar components throughout the several views. Like numerals having different letter suffixes may represent different instances of substantially similar components. The drawings generally illustrate, by way of example, but not by way of limitation, a detailed description of certain embodiments discussed in the present document.

FIGS. 7A, 7B and 7C show (a) measurement conventions utilized to derive the dynamic model of an embodiment of the present invention in the flight phase, illustrated as an unconstrained system. (b) Relevant link lengths that describe the first closed loop of the system. (c) Depict the constraint definitions employed in the formulation, e0=e1, and g0=g1 and link lengths pertinent to the second loop.

DETAILED DESCRIPTION OF THE INVENTION

Detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a representative basis for teaching one skilled in the art to variously employ the present invention in virtually any appropriately detailed method, structure or system. Further, the terms and phrases used herein are not intended to be limiting, but rather to provide an understandable description of the invention.

Figure 1:
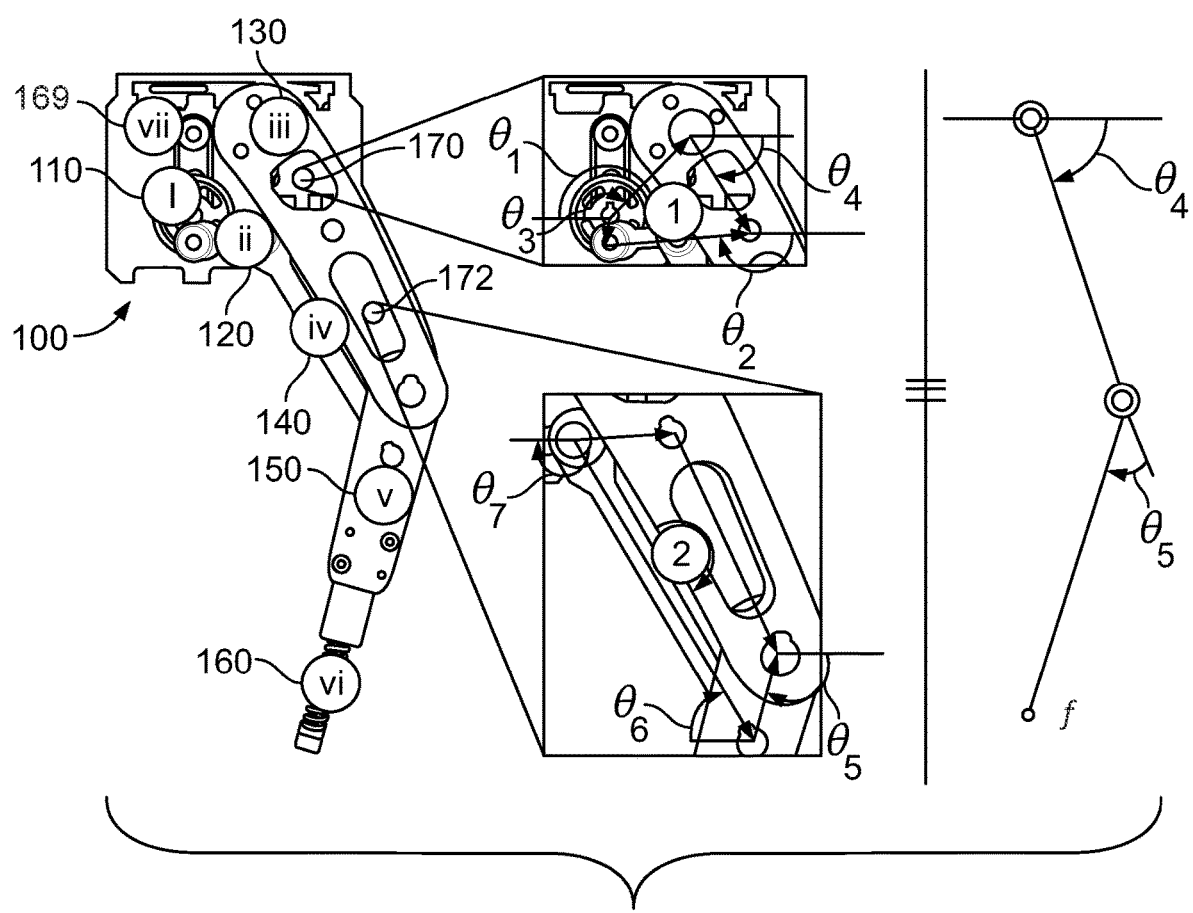
FIG. 1 shows (a) design and dimension specifications for an embodiment of the present invention. Left: Frontal view. (i) driving disk (ii) HFE link (iii) femur (iv) KFE link (v) tibia (vi) double compliance (spring and rubber foot tip) (vii) absolute encoder. (b) Close-up view of the two kinematic loops present in the mechanism. (c) Angular relationships simplify the structure so that it can be described as an OKC for kinematic purposes.

In one embodiment, the present invention, as shown in FIG. 1, represents an advancement to simplify dynamic legged locomotion while preserving the characteristics of articulated legs. Provided are leg 100 comprising driving disk 110, HFE link 120, femur 130, KFE link 140, tibia 150, double compliance (spring and rubber foot tip) 160, absolute encoder 169. FIG. 1B shows two kinematic loops 170 and 172 used in the mechanism. FIG. 1C shows how angular relationships simplify the structure so that it can be described as an OKC for kinematic purposes.

Hardware Design

The mechanical design of an embodiment of the present invention may be that of a monopod that may be roughly the size of an average domestic dog's leg, at 0.53 m in height. It weighs approximately 6.1 kg and is constructed with aerospace-grade Al 6061. It has only one actuated degree of freedom, driven by a BLDC motor (MOOG BN34-25EU-02LH) with 355 W power, 2.19 Nm peak torque, and 0.66 Nm continuous torque that is mounted with a 2 stage, 32:1 planetary gearbox and is placed behind the driving link. An absolute encoder (US Digital MA3-A10-125-B), may be mounted at a distance and connected to the driving disk via a timing belt to obtain position feedback. An incremental encoder (US Digital E2-5000-315-IE-H-G-3) is mounted for velocity feedback at the back of the motor. Finally, two-stage compliance is provided in the form of a spring and a rubber pad at the foot to withstand the impact during the stance phase.

In one embodiment, the present invention provides a CKC mechanism with two closed loops. Loop 1 is comprised of a four-bar mechanism with passive joints at A, B, and C as marked in FIG. 2. As shown in FIG. 1A, it may comprise a femur 140, which is guided by the driving disk 110 with the help of the hip flexion-extension (HFE) link 120. Loop 2 is another four-bar mechanism that comprises of the knee flexion-extension (KFE) link 150 that couples with the motion of HFE link 130 and guides tibia 160 to execute a smooth continuous trajectory at the foot.

Kinematic Simplification

In other aspects, the present invention provides an embodiment where the mechanism eliminates the requirement of using a multi-actuator coordination, observed in open kinematic chain mechanisms (OKCs), to take a single step. The intuitive mechanism couples the hip and knee flexion/extension and thus requires only one actuator for whom, a single revolution corresponds to a single stride. Furthermore, this approach eliminates a layer of kinematic computation. Through kinematic loop closure equations, the system can be represented as an OKC, as seen in FIG. 1A. The arrangement of the linkages simplifies the inverse kinematic control problem merely to a one-to-one mapping. The position of the foot, f, is directly linked to the absolute angle of the motor, $\theta_1$. It is then obvious that at any position of the input crank given by the absolute encoder, the position of the foot is known to the system without any significant calculations.

The one-to-one mapping can be implemented in the controller through a lookup table, vastly reducing the computational requirements by removing the need for a foot trajectory generator and the calculation of inverse kinematics.

Parametric Optimization of the Mechanism

Conventional legs built for dynamic locomotion have access to the 3D workspace, and in certain cases, only the 2D workspace, as dictated by the number of actuators provided per leg. This allows for various gaits/maneuvers and on the fly adjustments. However, the single degree of freedom approach significantly curtails the workspace and restricts the foot to a single traceable trajectory. Therefore, careful design of the mechanism is required to achieve the desired performance.

Figure 2A:
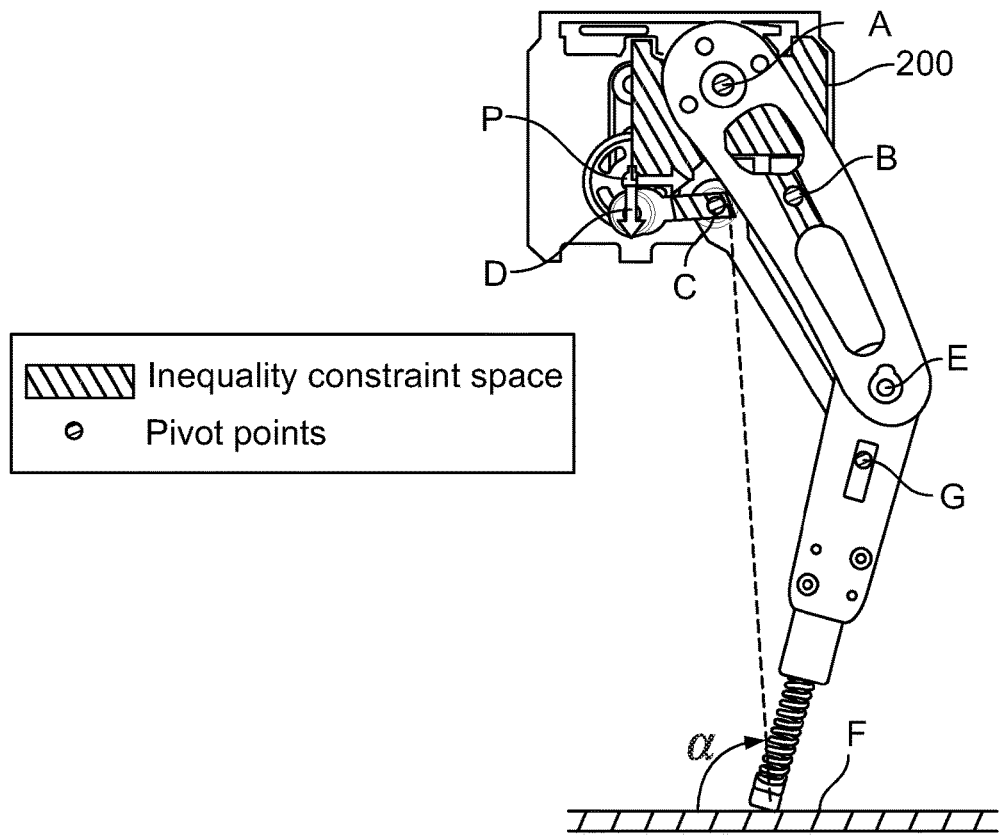
FIGS. 2A-2B show (a) notations used to formulate the optimization problem, the critical pivots and their respective constraint evolution space and (b) designed ideal trajectory utilized in the optimization.
Figure 2B:
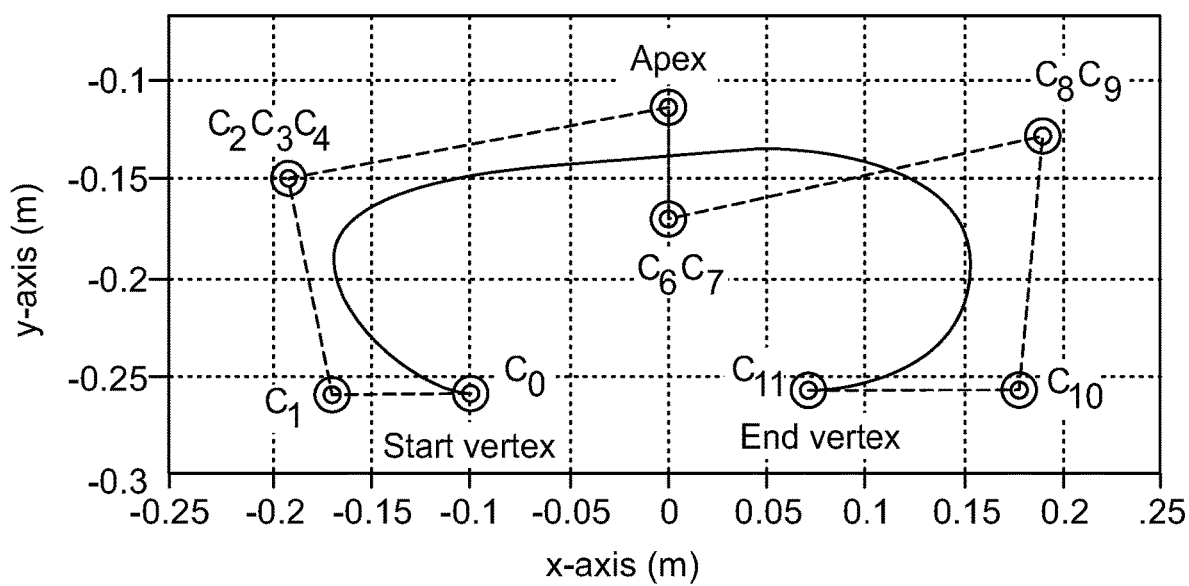

In other embodiments of the present invention, a six-bar mechanism may be integrated onto a quadrupedal platform to perform movements such as trot/trot-running gait. As a result, the present invention, as shown in FIGS. 2A and 2B, provides a desired flight-phase trajectory. In a preferred embodiment, the stance trajectory should be sinusoidal.

The combined trajectory can be abstracted by a polynomial, $f_{des}(\theta_1)$, where $\theta_1$ is the angle made by the crankshaft with the x-axis of the reference frame at point D. Note that the domain of $\theta_1 \in [0\ 360]$, and for all computations in this work, counterclockwise is considered positive. The mechanism is illustrated again in FIG. 2B which illustrates critical pivot locations $A=[A_x A_y]$, $B=[B_x B_y]$, $C=[C_x C_y]$, and $G=[G_x G_y]$ that affect the trajectory directly. The leg is parameterized in FIG. 7 and the same convention may be followed. The design space is then described by the set $\{l_c\ l_1\ l_2\ l_3\ l_4\ l_5\ l_s\ l_f l_r\ \theta\}$. An extra parameter of interest is the angle of attack, a, that the leg makes with the vertical during impact with the ground. The desired trajectory and the minimal angle of attack lead to the formulation of the multi-objective function in Eq. 1, with weights $W_1$ and $W_2$.

$$W_1 \sum_{\theta_1=85°}^{100°} \min f(\alpha) + W_2 \sum_{\theta_1=0°}^{360°} (f(\theta_1) - f_{des}(\theta_1))^2 \qquad (1)$$

Here f ($\alpha$) is straight-forward, and f ($\theta_1$) is the current position of the foot with respect to the crankshaft angle $\theta_1$.

Optimization Results

Figure 3:
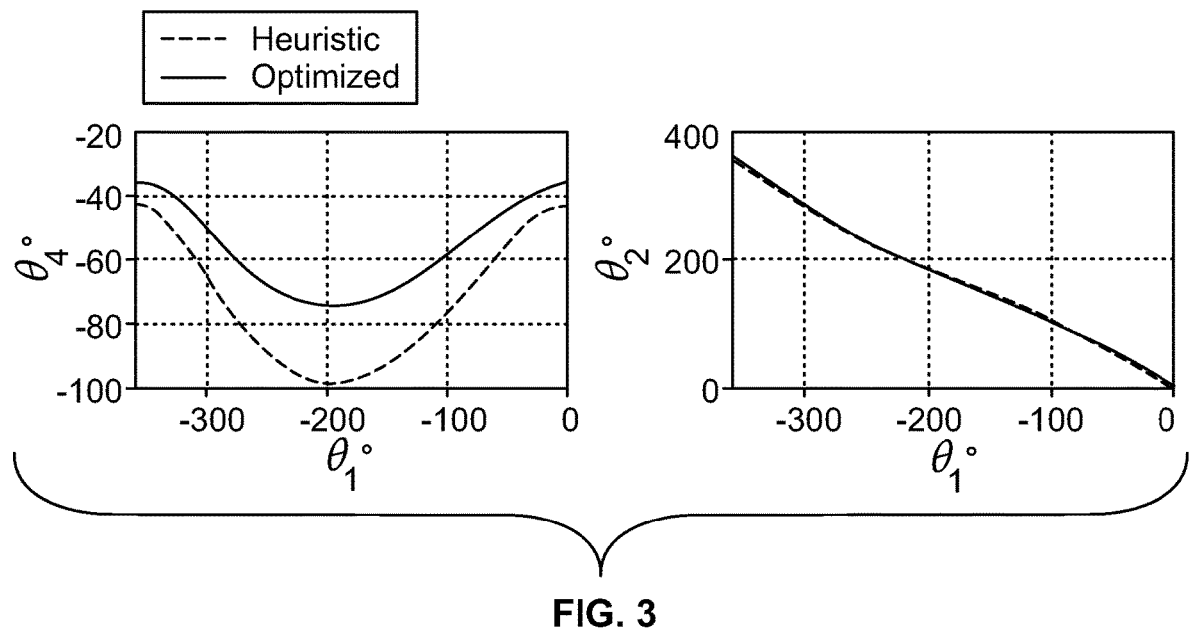
FIG. 3 is a comparison of the optimized angular profiles of loop one against the profiles obtained from heuristic link lengths in one complete rotation.
Figure 4A:
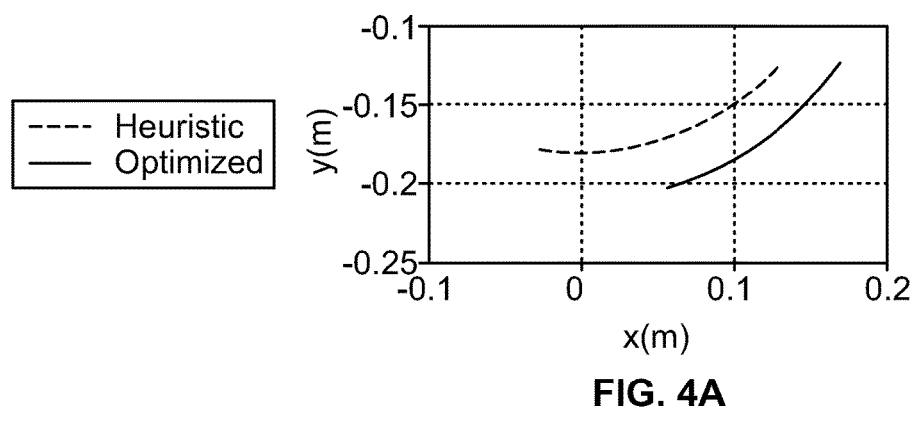
FIGS. 4A-4B show a comparison of the optimized trajectories of the knee (a) and the foot (b) against the profiles obtained from heuristic link lengths in one complete rotation. The heuristic foot trajectory is out of scale and not pictured.
Figure 4B:
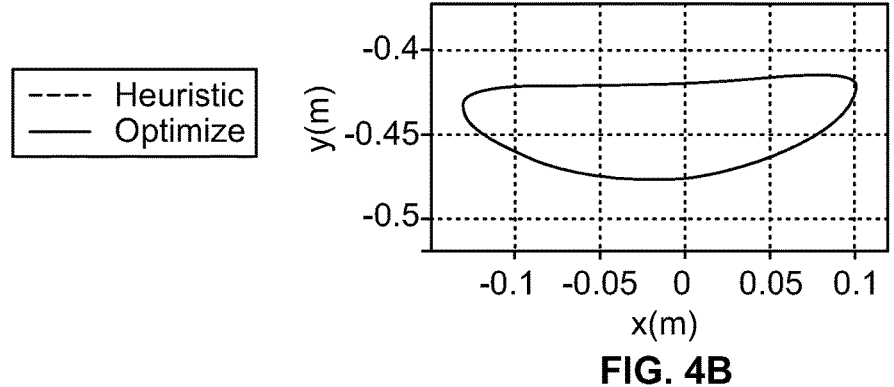

The optimization results in link lengths, and angle that generate a trajectory, which closely traces the desired trajectory as shown in FIG. 4B. The angles corresponding to the first loop are depicted in FIG. 3, due to their importance to the knee trajectory.

While not pictured, the second loop angles undergo a similar evolution. The optimization's validity is proven in the result of the first loop, where the trajectory of the knee is shown to be constrained in the first quadrant, as compared to the trajectory that was the result of heuristic link lengths, as in FIG. 4A.

The second loop may then built upon this outcome, resulting in a sinusoidal stance phase. The flight phase trajectory in FIG. 4B can be seen to possess a slight concavity near the apex, which is attributed to satisfying the multiple inequality constraints posed to the system. However, the effect of this concavity on the gait is trivial, as the trajectory still possesses a rapid entrance into the stance phase.

Dynamic Model of Present Invention

Figure 5:
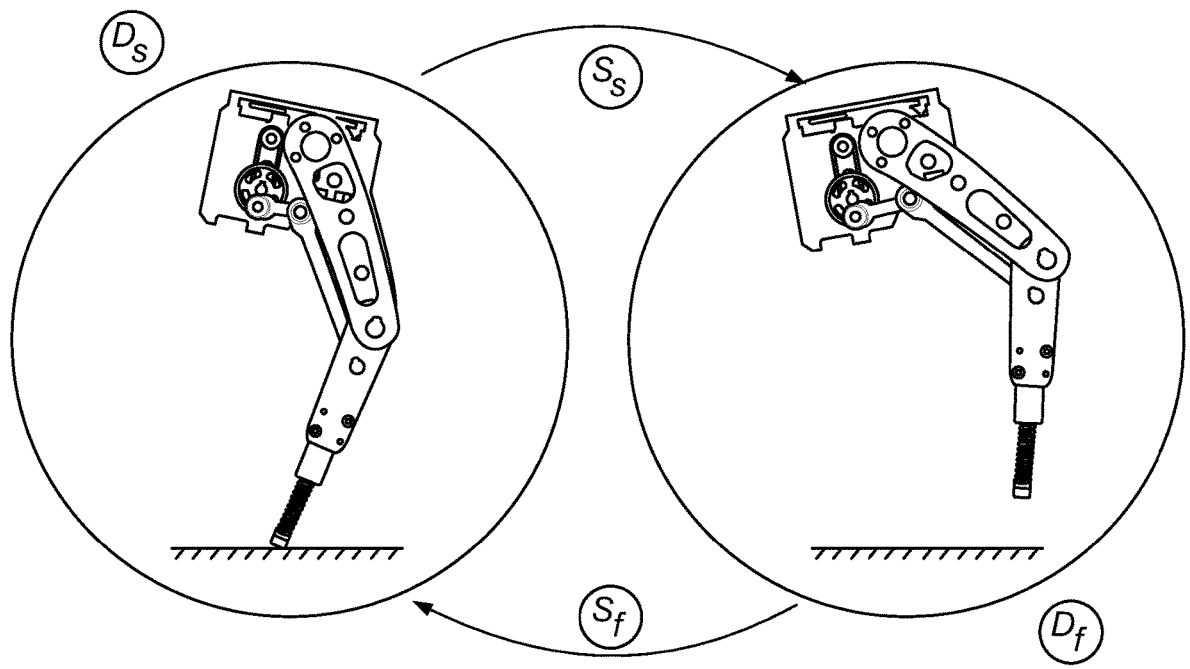
FIG. 5 is a state machine implementation of the stance and flight phase controller.

This section develops a mathematical description that leverages SPF formulation for imposition onto the hybrid dynamics framework to alleviate modeling difficulties. The general dynamic equation of motion (EOM) of a system with n links in independent generalized coordinates, denoted by the vector $q \in \mathbb{R}^{n_q}$ formulated as:

$$H(q)\ddot{q} + C(q,\dot{q})\dot{q} + g(q) = B\tau + F_{ext} \qquad (7)$$

where H (q)$\in \mathbb{R}^{n_q \times n_q}$ represents the generalized mass matrix, C(q,$\dot{q}$)$\in \mathbb{R}^{n_q}$ contains the Coriolis and centrifugal terms, is the gravitational term, B(q) is the torque distribution matrix, and $\tau \in \mathbb{R}^{n_q}$ is the torque vector provided by the actuators. Equation 7 results in second-order ODEs identical in dimension to the number of degrees of freedom of the system. This implies that for each DOF there is an independent control input. Furthermore, this formulation possesses several structural properties that are favorable in control design. However, CKCs like the present invention do not enjoy the same properties, as they are identified by high-index DAEs. The implicit nature of DAEs suggests the presence of dependent variables in the dynamic model that describes the mechanism. This coupling of dependent variables with independent variables impedes control design, and hence such a model is not desired. Most importantly for the development of control algorithms, as highlighted above, it is desired for the model to be defined only by the independent variables Hybrid Dynamics Framework In other aspects, the present invention provides a hybrid dynamic model. For the hybrid system, a 4-tuple $\mathcal{H} = (\mathcal{D}, S,$ $\Delta, \mathcal{F})$ may be utilized. $\mathcal{D}$ is a set of two domains, where $\mathcal{D}_S$ is the stance domain, and $\mathcal{D}_f$ is the flight domain. The stance domain is where the leg is in contact with the ground, and the flight domain is where the leg is in the aerial phase. Both domains represent continuous dynamics but differ due to the addition of two coordinates in the flight phase that map the position of the center of mass with respect to the inertial frame, {O} as seen in FIG. 7. S:={$S_S$, $S_f$} is a set of guards that encodes the state of the robot at a transition from $\mathcal{D}_S$ to $\mathcal{D}_f$ and vice-versa. Note that the constituents of set S are discrete events. The continuous and discrete dynamics are tied together by $\Delta$, a set of switching functions. $\Delta$ feeds appropriate initializations for the corresponding field, $\mathcal{F}$, of continuous dynamics. A visual representation tailored for embodiments of the present inventions during sagittal running is illustrated in FIG. 5. The mathematical description of each mode follows.

Underlying Constrained EOMs (Flight Phase Dynamics)

Figure 6:
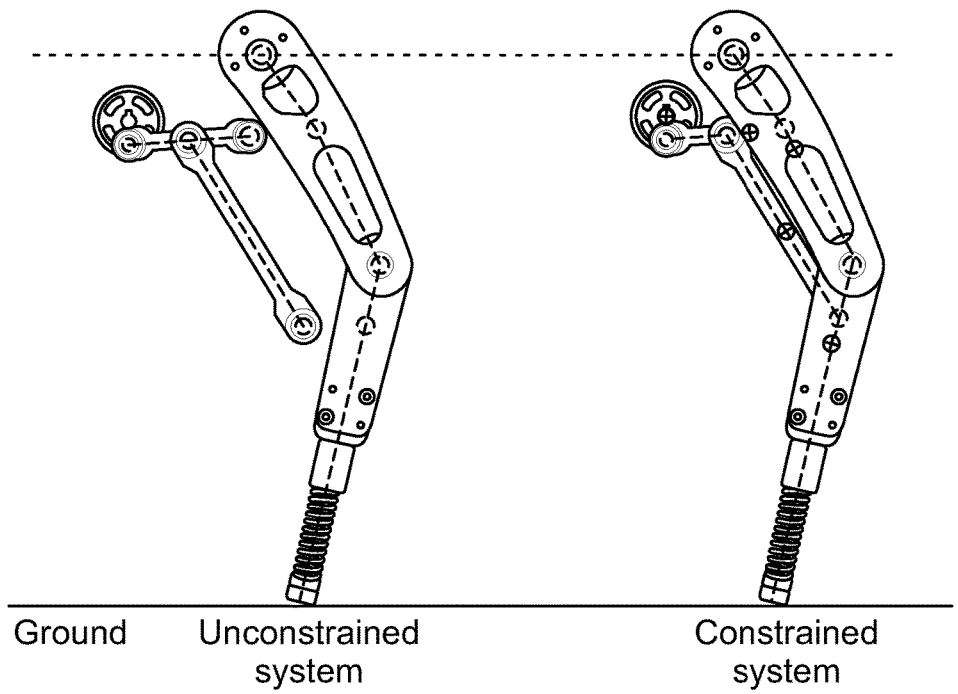
FIG. 6 illustrates the virtual separation method aided to alleviate modeling of the CKC for a robot of the present invention on the left. Towards the right, rejoining of the separated joints and reduction of generalized coordinates that completely describe the robot is depicted.

The DAE is first established followed by ODE approximation for the "unpinned system" in-flight phase. The method of virtual separation is adapted to derive the dynamic model of the CKC mechanism under consideration. First, this method prescribes a separation of joints at strategic locations to form serial and branched kinematic chains as shown in FIG. 6.

Such a system may be denoted as an "unconstrained system." Traditional methods used for serial chains can then be applied to formulate the unconstrained system's EOMs. To capture the dynamic configuration of this floating base system, two coordinate frames are defined, an inertial reference frame {O} and a body-fixed frame {B}. In the flight phase, two extra coordinates, $x_b$, and $y_b$, are added to track the position of the body with respect to {O}. The absolute orientation of the monopod in the sagittal plane is notated in $q_{Pitch}$.

In addition, each link's configuration relative to its previous frame is represented by $q_i$, with i={1, . . . , 5}. These variables are collected in the vector $q_d := [q_1 q_{Pitch} x_b y_b q_2 q_3 q_4 q_5]^T$ and are illustrated in FIG. 2. Further, the masses of the bodies are given by $m_i$, and the respective inertias are etched in $I_i$. Similarly, the link lengths are denoted by $l_i$, and the position of the center of mass of each body is given by $l_{cm,i}$. With the help of the Lagrangian formulation, the EOMs of the unconstrained system are then given by:

$$H'(q_d)\ddot{q} + C'(q_d,\dot{q}_d)\dot{q}_d + g'(q_d) = B\tau + F_{ext} \qquad (8)$$

Here, H'($q_d$)$\in \mathbb{R}^{8 \times 8}$, C'($q_d$) $\in \mathbb{R}^{8 \times 8}$ and g'($q_d$)$\in \mathbb{R}^{8}$.

For the sake of brevity, the elements on the right-hand side of the equation, $\tau$ and $F_{ext}$, are dropped. This term is not affected by the defined process and can be added back later without any effort.

Next, this method dictates the incorporation of constraint equations given by $\phi$ ($q_d$) into the mathematical description of the system, thus reconnecting the separated joints and resulting in a constrained system. The corresponding constraint definitions are provided in FIG. 7. The resultant system in the flight phase is characterized by constrained EOMs that are DAEs and assume the form of (9).

$$\begin{cases} H'(q_d)\ddot{q} + C'(q_d, \dot{q}_d)\dot{q}_d + g'(q_d) \\ \phi(q_d) = 0 \end{cases} \qquad (9)$$

SPF Dynamic Formulation

In other aspects, an embodiment of the present invention may be designed to completely avoid handling the DAEs by approximating them as equivalent ODEs. Due to the kinematic coupling present in the mechanism, $q_1$ alone is sufficient to describe the leg's motion, which in the traditional sense implies that a single ODE is sufficient to characterize the dynamics of the system. Since it is a planar floating base system, the additional three coordinates x, y, and $q_{Pitch}$ are necessary for a complete description. These four coordinates are therefore termed as independent variables and are collected in the vector, $q := [q_1 q_{Pitch} x_b y_b]^T$. The surplus variables in $q_d$ are the dependent variables and are collected in a separate vector, $z := [q_2 q_3 q_4 q_5]^T$. To eliminate the first order derivative terms of z in (3) and obtain an explicit description of the CKC monopod, the singularly perturbed dynamic model for fixed base models is leveraged for this floating base dynamic model.

Given that this minimal order model revolves around the representation of DAEs as ODEs, the problem hinges upon the approximation of the algebraic constraints. Therefore, a variable $w := \phi(q_d)$ is introduced to capture the degree of constraint violation. Ideally, it is desired for this value to asymptotically converge to zero. By definition, w is an arbitrary variable, allowing the flexibility to decide its dynamic behavior. Hence, we designate $\dot{w} = -1/\varepsilon * w$ to assure convergence to the invariant set $\{0\}$. Here, $\varepsilon$ can accommodate any small positive number. By definition of w, this relationship can then be rewritten as in Eq. 10

$$J_z \dot{z} + J_q \dot{q} = -\frac{1}{\varepsilon} \phi(q_d) \quad (10)$$

where $J_z$ and $J_q$ are the Jacobian matrices. Note that the inclusion of Eq. 9 introduces "fast dynamics" into the model, thus eliminating the algebraic equations. However, the governing ODE in Eq. 9 is still coupled with the second order terms of the dependent variables in z. Therefore, a dimensionality reduction process is undertaken. To begin, we will consider two selector matrices $S_q$ and $S_z$ to encapsulate the relationship that q and z hold with $q_d$. This correlation can be denoted as $[q\ z]^T = [S_q\ S_z]^T q_d$. Then, $\Gamma(q_d)$ is formed by combining $\phi(q_d)$ and $S_q(q_d)$ as in Eq. 11.

$$\Gamma(q_d) := \begin{bmatrix} \phi(q_d) \\ S_q(q_d) \end{bmatrix} \quad (11)$$

Additionally, we can define $(\dot{q}_d) = \rho(q_d)\dot{q}$. From this definition, $\rho$ is then given as:

$$\rho(q_d) = \Gamma^{-1}(q_d) \begin{bmatrix} 0 \\ I_{n_q \times n_q} \end{bmatrix} \quad (12)$$

With this, the dimensionality reduction can then be performed by noting Eq. 12. The reduction can be verified by observing the real coordinate spaces: $H(q_d) \in \mathbb{R}^{4 \times 4}$, and $C(q_d) \in \mathbb{R}^{4 \times 4}$ and $g(q_d) \in \mathbb{R}^4$. Finally, the model can be pieced together as in Eq. 14, by replacing $q_d$ with (q,z) and combining Eq. 10, Eq. 13, and the torque terms as in Eq. 7.

$$\begin{cases} H'(q_d)\ddot{q} + C'(q_d, \dot{q}_d)\dot{q}_d + g'(q_d) \end{cases} \begin{vmatrix} H(q, z) = \rho(q_d)^T H'(q_d) \\ C(q_d, \dot{q}_d) = \rho(q_d)^T C'(q_d, \dot{q}_d)\rho(q_d) + \rho(q_d)^T H'(q_d)\dot{\rho}(q_d, \dot{q}_d) \\ g(q_d) = \rho(q_d)^T g'(q_d) \end{vmatrix} \quad (13)$$

$$\begin{bmatrix} H(q,z) & 0_{n_q \times 1} \\ 0_{n_z \times 1} & J_z(q,z) \end{bmatrix} \begin{bmatrix} \ddot{q} \\ \dot{z} \end{bmatrix} = \begin{bmatrix} -C(q,\dot{q},z,\dot{z})\dot{q} - g(q,z) + B\tau - \\ \frac{1}{\varepsilon}\phi(q,z) - J_q(q,z)\dot{q} \end{bmatrix} \quad (14)$$

Figure 8:
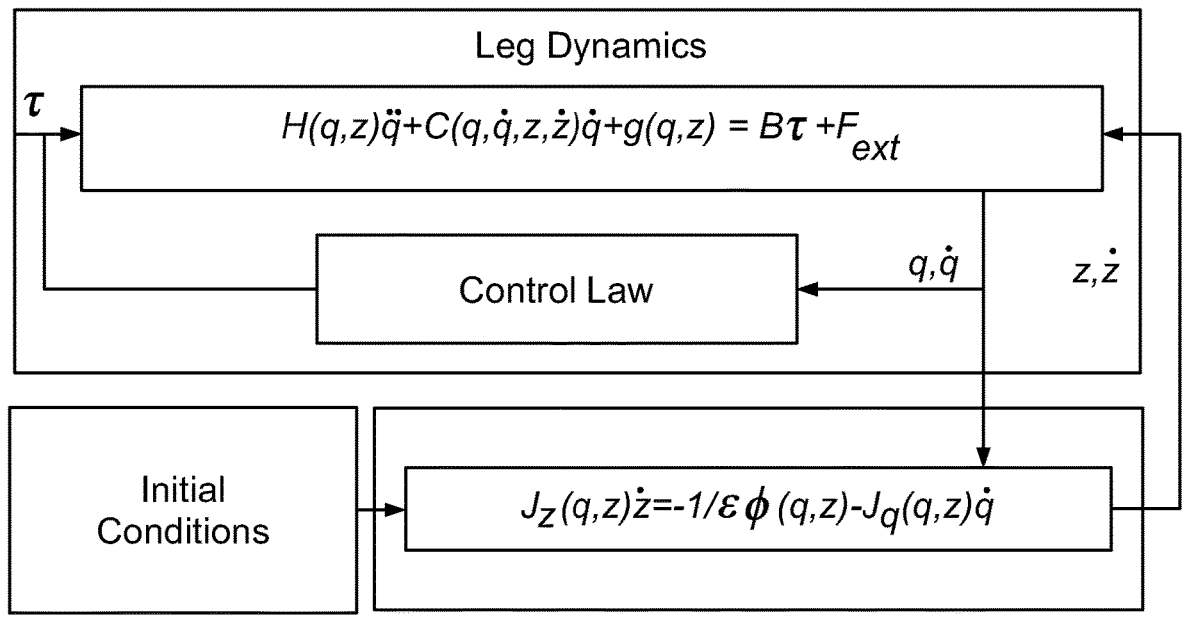
FIG. 8 illustrates the singularly perturbed dynamic model.

Eq. 14 is the ODE approximation representing the dynamics of the PRESENT INVENTION's flight domain, $\mathcal{D}_f$, which is visualized in FIG. 8.

Impact Model/Reset Map

The impact model is incorporated in the reset map from flight to stance phase and is $\Delta_f^s$. General assumptions are made to arrive at this impact map. This map resets the initial conditions going into the stance phase, hence the name reset map. It assumes that pre-impact states, $(q_f^-, \dot{q}_f^-)$, from the flight-phase dynamics are accessible. Post impact states, $(q_s^+, \dot{q}_s^+)$, are then provided as an output. Here, the collision is assumed instantaneous and is modeled as an inelastic collision. This implies that the position of the feet pre-impact denoted by $q^-$, and the position of the feet after impact represented by $q^+$, are invariable, i.e., $q^- = q^+$. Furthermore, an important assumption is that there is no slippage between the feet and ground on collision is made. The impact map, Eq. 15 is solved for $\dot{q}^+$, the generalized velocity after impact.

$$H(q^+)\dot{q}^+ - H(q^-)\dot{q}^- = F_{ext} \quad (15)$$

Likewise, $\dot{q}^-$ is the velocity prior to impact. Here, the external force, $F_{ext}$, at the foot end is derived through the principle of virtual work and is projected onto the joint space as:

$$F_{ext} = J_c(q,z)^T F \quad (16)$$

Where, $$J_c(q,z) = \frac{\partial p(q,z)}{\partial q}$$

is the Jacobian of the foot position with respect to $\{O\}$ and $F = [F_T F_N]^T$ is the vector of tangential and normal forces at the foot end.

Monopod Running Simulation

In the absence of a closed form solution to the dynamics of the hybrid non-linear system, the SPF-hybrid dynamic model of the CKC derived above may be validated through numerical simulation. In order to focus the simulation on the verification of the SPF framework and to replicate constraints on the experimental setup, the analysis is restricted to the sagittal plane. Furthermore, $q_{Pitch}$ is equated to zero.

Simulation Implementation

The simulation is initialized from the flight phase and is fed with a 14-dimensional initial value vector. The initial conditions include the dependent velocities, abstracted as ż. However, the output of the SPF hybrid dynamic model then reduces the system to a 10-dimensional output through the decay of the SPF fast dynamics. Upon impact, these outputs are fed to the reset map, and the stance phase initial conditions are calculated. In the stance phase, the fixed frame position and velocity can be extracted using the relationship between the foot and the fixed frame, as the foot is considered a pivot point during this phase.

Once the desired phase angle is reached, a predetermined set point for the angle between the foot and the body fixed frame at the hip as seen in FIG. 7, the transition to flight phase is triggered. The stance phase states are multiplied with the identity matrix encoded within the flight map in order to provide the initial conditions to map back into the flight phase. This cycle is repeated for each step.

It becomes clear that some form of control is necessary in order to take a single step. However, the focus is to show the validity of the SPF model, we seek a simple controller. For monopod running, to move the leg to the desired angle of attack, $\alpha_m^{des}$, before the next impact is the most basic-level control requirement. The control law is specified in Eq. 17.

$$\tau = K_P(\theta_1^{des}(\alpha_m) - \theta_1) - K_D \dot{\theta}_1 \tag{17}$$

Here, $\theta_1$ is the measured angle of the crankshaft, $\dot{\theta}_1$ is the measured angular rate, and $K_P$ and $K_D$ are the proportional and derivative gains, respectively.

Results

Figure 9:
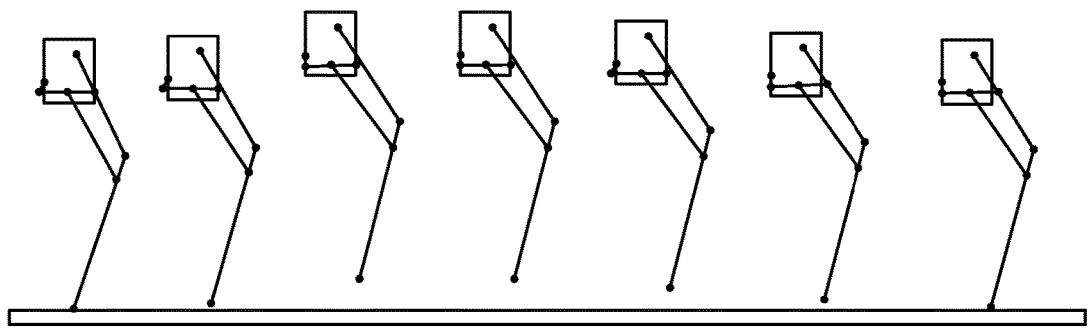
FIG. 9 is a simulation sequence of an embodiment of the present invention's flight phase while performing a running motion at 3.2 m/s.

The simulation was performed for 12 steps, and frames of the simulation during flight-phase are shown in FIG. 9. The simulation demonstrated the SPF model was successful in the hybrid framework, as shown by the constraints holding throughout the simulation. The constraint errors were abstracted by $w_1$-$w_4$, where $w_1$ and $w_2$ correspond to the x and y errors of the constraint equation generated by the condition $e_0 = e_1$, while $w_3$ and $w_4$ represent the x and y errors for the condition $g_0 = g_1$.

Figure 10:
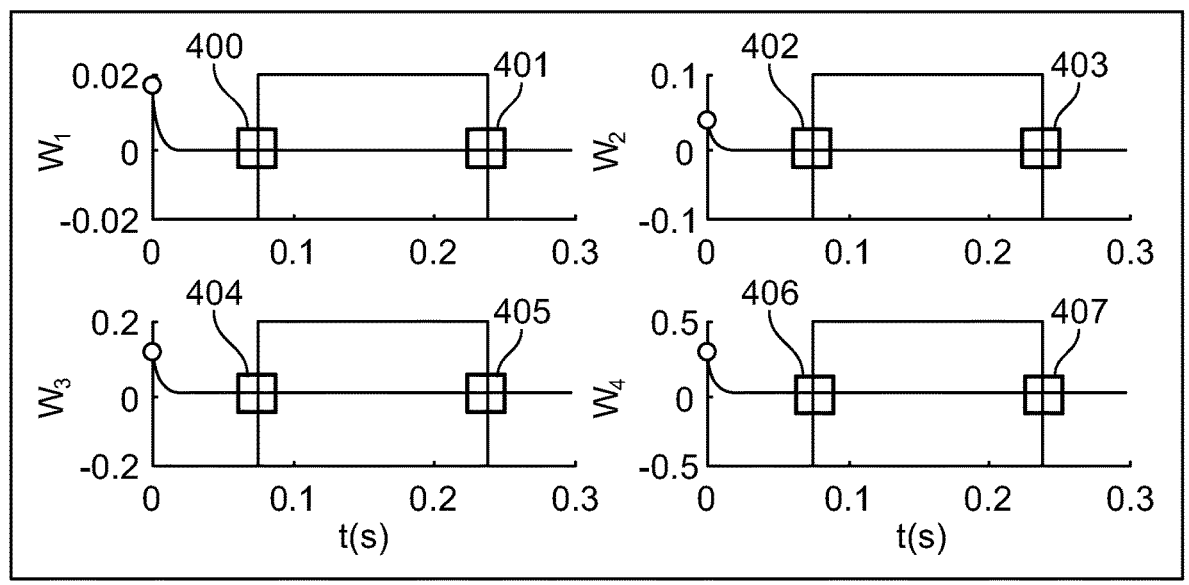
FIG. 10 shows the asymptotic tracking of constraint error to zero. Constraints are invariant to the hybrid dynamic framework.

As seen in FIG. 10, constraint errors asymptotically track zero and maintain this behavior during state transitions. In the figure, blocks 400-407 highlight the transition from stance to stride phase and vice versa, while blocks 420-423 denote the stance phase.

Figure 13:
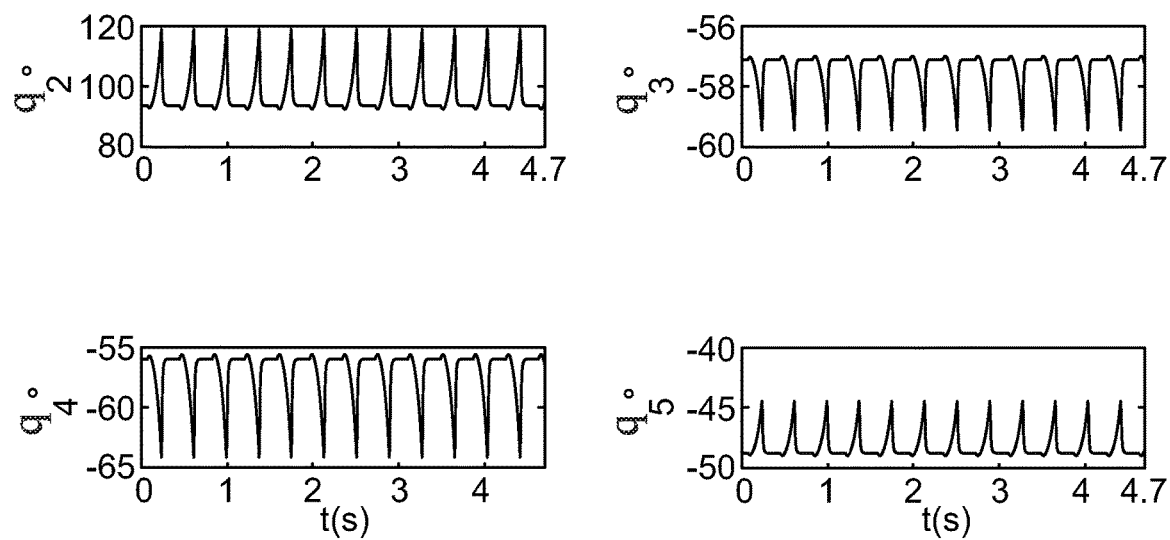
FIG. 13 illustrates the angular behavior of the dependent variables (z) over time.

FIG. 10 shows the response of $q_1$ during the simulation. It can be seen that $q_1$ shows a periodic limit cycle. Note that the angle does not prescribe a full rotation due to the simplicity of the controller utilized in the simulation, but rather oscillates within a short range. However, this does not prevent the leg from following a satisfactory trajectory, it is simply inefficient to implement in actuality. The results of the implicit angles are found in FIG. 13. The ranges shown by these angles correspond to the ranges obtained in the optimization, relative to the motion of $q_1$. The sharp drops in the angular plots and the limit cycles signify impact.

Figure 11A:
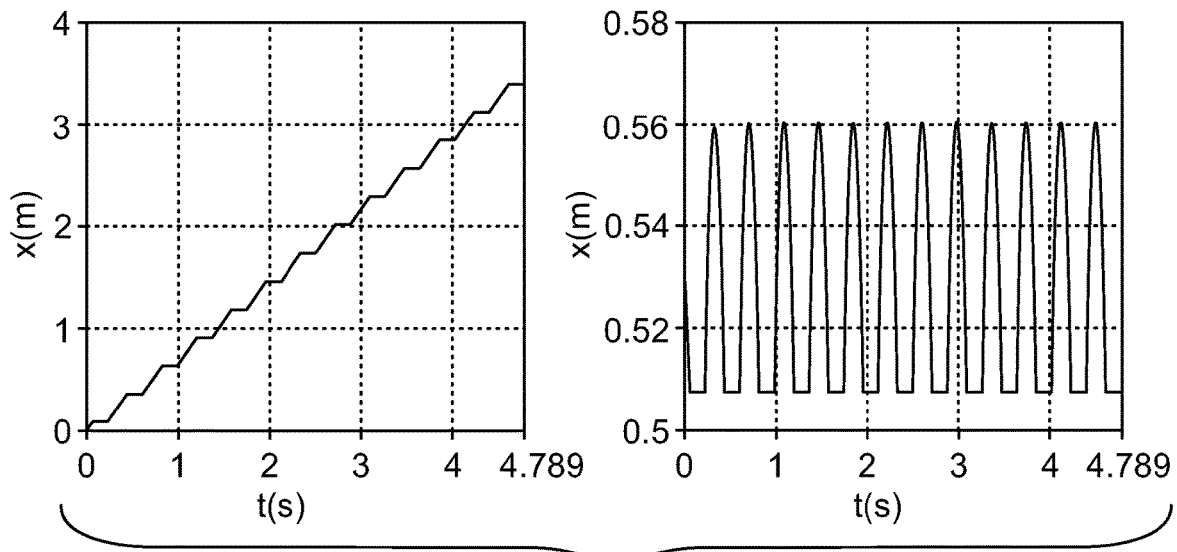
FIGS. 11A-11B show (a) Horizontal and vertical position of an embodiment of the present invention. A constant angle of attack assures uniform leg height (y). (b) Limit cycles of PRESENT INVENTION running for 12 steps in the simulator. Pictured on the left is the phase portrait of the height and on the right is the evolution of the driving joint.
Figure 11B:
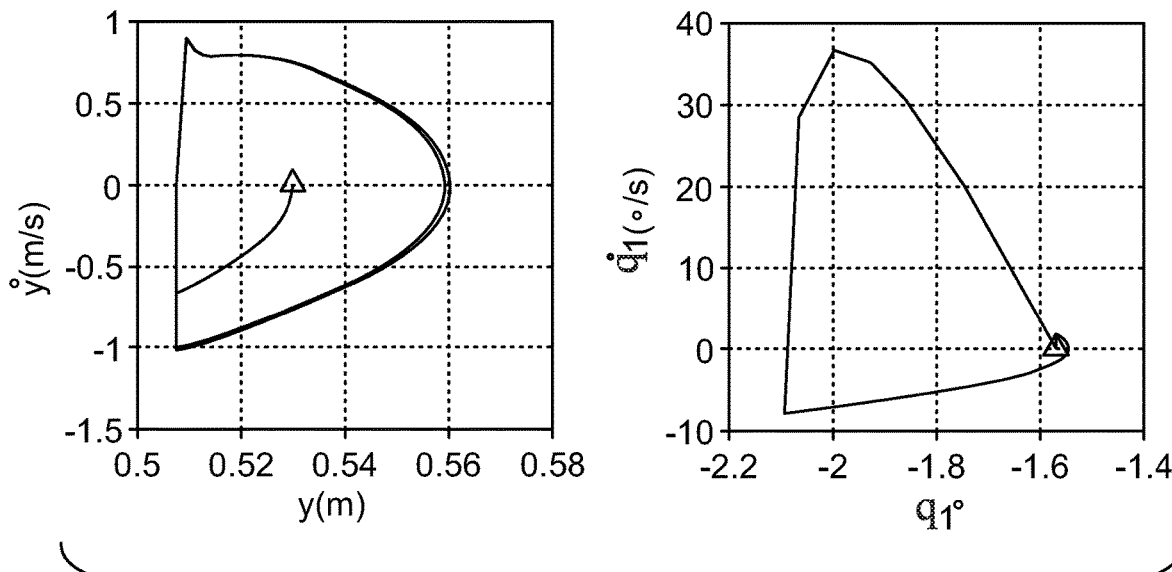
Figure 12:
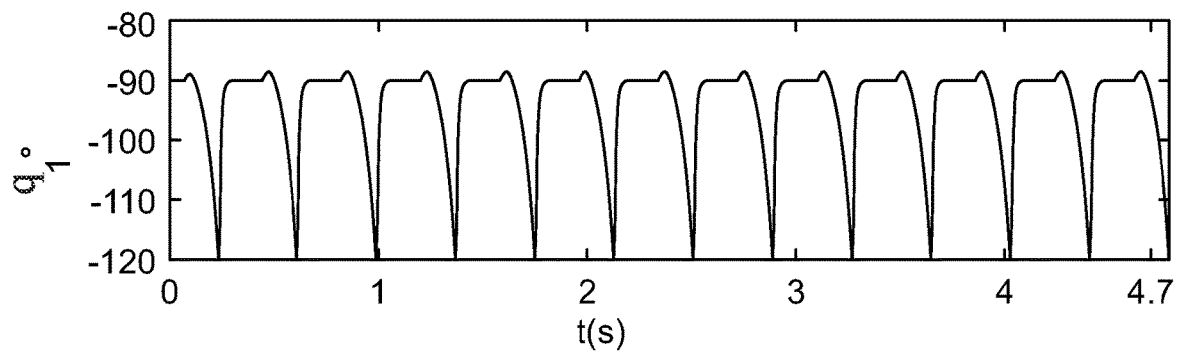
FIG. 12 illustrates a commanded angle of the driving joint ($q_1$) over time.

FIG. 11A shows the x and y position of the body-fixed frame with respect to the inertial frame over time. This demonstrates that the simulation successfully obtained monopod running, with a monotonically increasing x-position and a cyclical y-position. The periodicity in y and $q_1$ are shown in FIG. 11B through the limit cycle. In these, the vertical straight lines indicate the instantaneous impact.

The pitch angle was restricted as it is unnecessary to demonstrate the stability of the system as it is inherently stable.

Setup

Figure 14A:
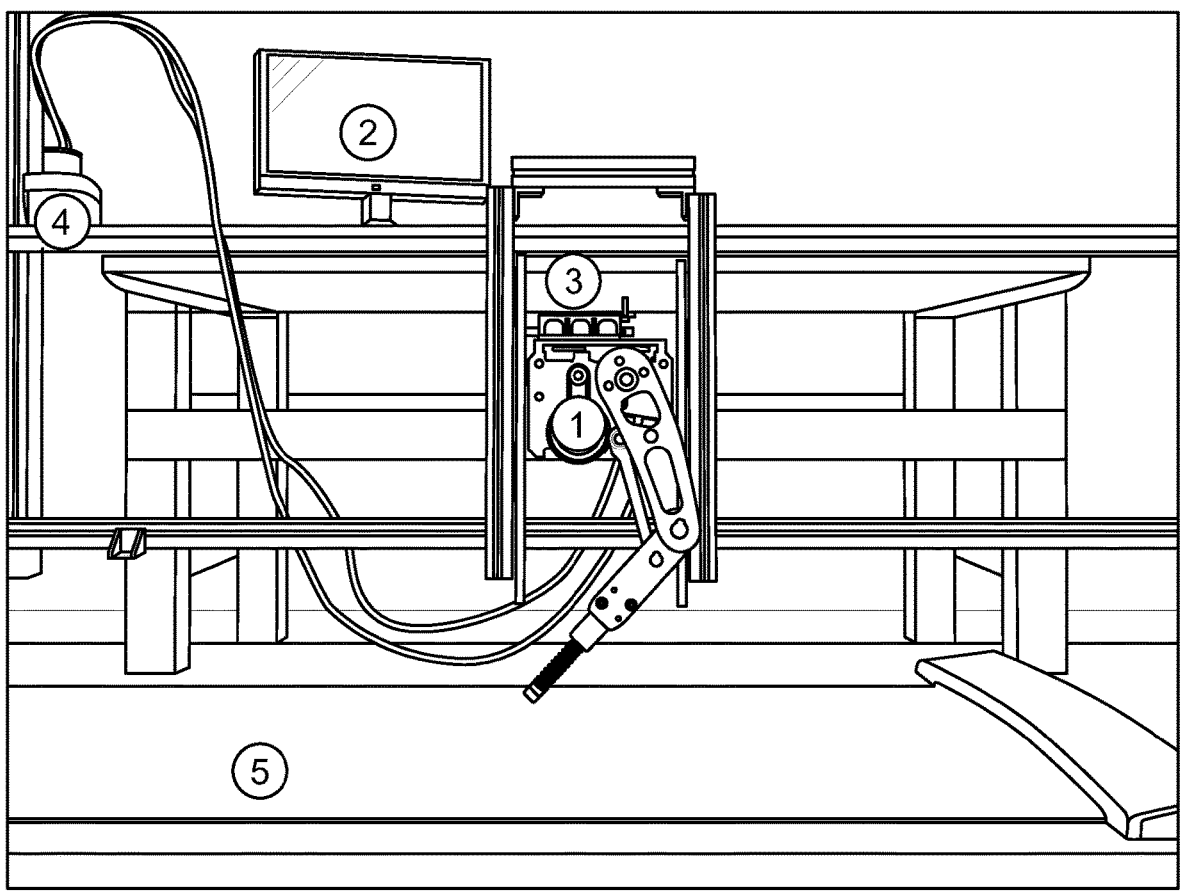
FIGS. 14A-14B show (a) Setup for testing of an embodiment of the present invention's running gait: 1) an embodiment of the present invention, 2) Higher level controller, 3) LiPo batteries in series, 4) Emergency stop, 5) Treadmill. (b) Illustration of trajectory tracking experimental results.

In certain aspects, when the present invention is planar, its mobility is constrained to the sagittal plane using a custom framing, as shown in FIG. 14A. The framing may be mounted onto a commercially available treadmill to evaluate the running performance of the robot. The motor is commanded by the low-level controller via a Teensy microcontroller, while a higher-level controller runs on a computer and provides the Teensy with speed commands. Three 14.8 V LiPo batteries are connected in series (32.56 Whrs) to power the robot.

A first focus was on a trajectory validation, where the leg was raised above the treadmill surface and is constrained in both the x and y direction. A visual object tracking system, LOSA, was attached to the rubber pad of the foot. The device was then run for a set period, and the trajectory of the foot was recorded.

Another focus was to demonstrate open-loop running, wherein the leg was unconstrained in the x and y directions. A minimum y position was imposed with a bumper to protect the hardware. The device was run at multiple speeds from 0.5 m/s to a maximum of 3.2 m/s to observe consistency of performance, with the treadmill speed matched in order to achieve in-place running.

Results

Figure 14B:
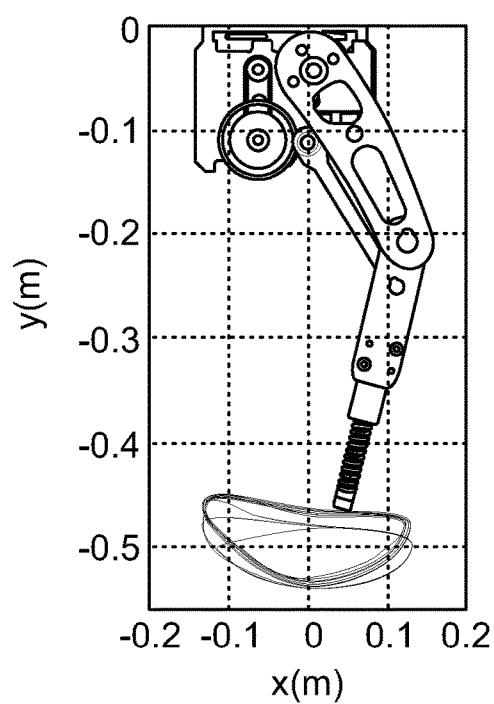
Figure 15:
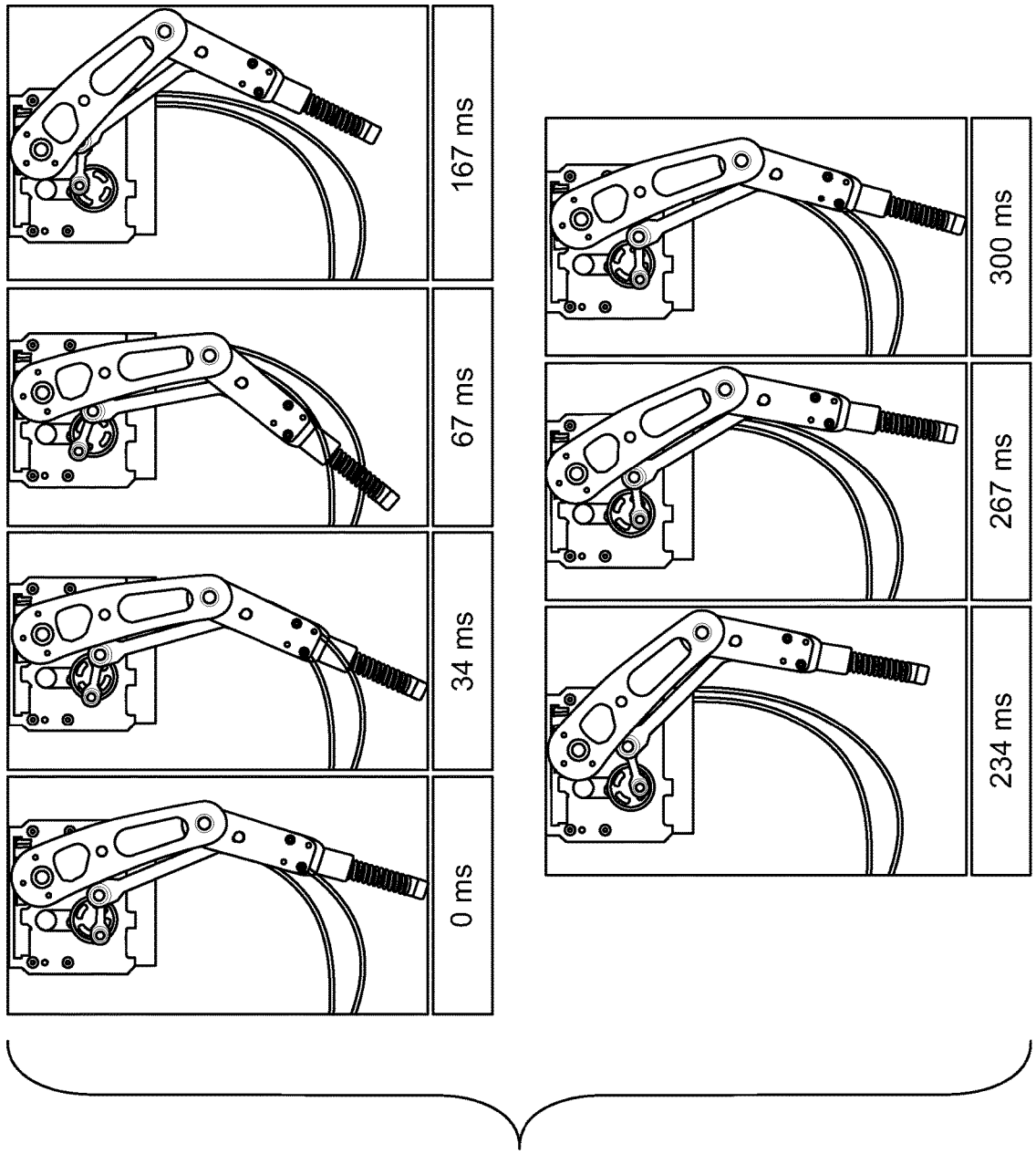
FIG. 15 provides a sequence of snapshots showing an embodiment of the present invention's running Cycle at 3.2 m/s.

Leveraging the millimeter accuracy of the LOSA object tracking system, the foot trajectory was recorded and is shown in FIG. 14B. The results reveal the success of the optimization, as the stride length and height correspond to those resulting from the kinematic simulations performed following the optimization. As evident from FIG. 14B, the foot tracked a trajectory close to the designed trajectory. The small inconsistencies in the trajectory are due to vibration in the framing due to high speeds. Open loop running can be seen in the sequence shown in FIG. 15. The sequence depicts a single stride cycle at 3.2 m/s. The open-loop running shows the promise of the mechanism in performing quadrupedal gaits on flat terrain, as well as its capability to achieve the targeted speed.

While the foregoing written description enables one of ordinary skill to make and use what is considered presently to be the best mode thereof, those of ordinary skill will understand and appreciate the existence of variations, combinations, and equivalents of the specific embodiment, method, and examples herein. The disclosure should therefore not be limited by the above-described embodiments, methods, and examples, but by all embodiments and methods within the scope and spirit of the disclosure.

What is claimed is:

1. A legged robot with two closed kinematic loops, comprising:
   a vertically oriented floating-base link, said floating-base link having one active joint and one passive revolute joint arranged, parallel to a frontal plane and having a driving link connected to said active joint;
   a hip flexion and extension link connected to an end of said driving link with a second revolute joint;
   a knee flexion and extension link mounted on said second revolute joint adjacent to said hip flexion and extension link, adjacent to a point of attachment with the said driving link;
   a femur link mounted on said passive revolute joint, said femur link having two other revolute joints, one adjacent to a point of attachment with said floating-base link and one at the other end on which a tibia link is mounted;
   a free end of said hip flexion and extension length is mounted on said first revolute joint of said femur link adjacent to the point of attachment with said floating-base link forming the first closed kinematic loop;

said tibia link has a revolute joint located adjacent to a connecting point with said femur link, which connects said free end of said knee flexion and extension link, forming said second closed kinematic loop; and a distal end of the tibia link is mounted with a compression spring of predetermined stiffness value to provide compliance during impact.

2. The legged robot of claim 1, wherein a lower end of the spring is fitted with a compliant rubber foot to provide a second-stage of compliance against impact forces.

3. The legged robot of claimed claim 2, wherein a flight-phase trajectory of the foot is jerk free and has a retraction rate that reduces energy losses at touchdown.

4. The legged robot of claim 1 wherein only one actuator is used to perform continuous dynamic locomotion.

5. A dynamic quadrupedal robot comprising:

four legs; each leg having a vertically oriented floating-base link, with one active joint and one passive revolute joint arranged, parallel to a frontal plane and having a driving link connected to said active joint;

a hip flexion and extension link connected to the other end of the driving link with another revolute joint;

a knee flexion and extension link mounted on a revolute joint located on said hip flexion and extension link, adjacent to a point of attachment with said driving link;

a femur link mounted on said passive revolute joint, said femur link having two other revolute joints, one adjacent to a point of attachment with said floating-base link and one at the other end on which a tibia link is mounted;

a free end of said hip flexion and extension length is mounted on said first revolute joint of said femur link adjacent to the point of attachment with said floating-base link, forming a first closed kinematic loop;

said tibia link has a revolute joint, located adjacent to a connecting point with said femur link, which connects a free end of the said knee flexion and extension link, forming a second closed kinematic loop; and a distal end of the tibia joint is mounted with a compression spring of predetermined stiffness value to provide compliance during impact.

6. The quadrupedal robot of claim 5 wherein the front legs and back legs are mounted on two different sagittal planes creating an offset for enhanced stability.

\* \* \* \* \*